US007375713B2

(12) United States Patent
Ota

(10) Patent No.: US 7,375,713 B2
(45) Date of Patent: May 20, 2008

(54) DATA DRIVER AND ELECTRO-OPTIC DEVICE

(75) Inventor: Yusuke Ota, Fujimi-machi (JP)

(73) Assignee: Seiko Epson Corporation (JP)

( * ) Notice: Subject to any disclaimer, the term of this patent is extended or adjusted under 35 U.S.C. 154(b) by 719 days.

(21) Appl. No.: 10/807,539

(22) Filed: Mar. 23, 2004

(65) Prior Publication Data

US 2004/0228265 A1 Nov. 18, 2004

(30) Foreign Application Priority Data

Mar. 24, 2003 (JP) ............................ 2003-080150

(51) Int. Cl.
*G09G 3/36* (2006.01)
*G06F 3/38* (2006.01)

(52) U.S. Cl. .......................... 345/98; 345/99; 345/100; 345/204; 345/211

(58) Field of Classification Search ............ 345/60–83, 345/55–100, 204–214
See application file for complete search history.

(56) References Cited

U.S. PATENT DOCUMENTS

| | | | | |
|---|---|---|---|---|
| 5,434,589 | A * | 7/1995 | Nakamura et al. | 345/98 |
| 6,369,784 | B1 * | 4/2002 | Maslennikov et al. | 345/75.2 |
| 7,012,600 | B2 * | 3/2006 | Zehner et al. | 345/63 |
| 2003/0025689 | A1 * | 2/2003 | Kim | 345/211 |

FOREIGN PATENT DOCUMENTS

| | | |
|---|---|---|
| JP | 07-271323 | 10/1995 |
| JP | 10-083157 | 3/1998 |
| JP | 10-105132 | 4/1998 |
| JP | 11-015548 | 1/1999 |
| JP | 11-202842 | 7/1999 |
| JP | 2001-249320 | 9/2001 |
| JP | 2002-196722 | 7/2002 |

OTHER PUBLICATIONS

Communication from Japanese Patent Office regarding counterpart application.

* cited by examiner

*Primary Examiner*—David L. Lewis
(74) *Attorney, Agent, or Firm*—Harness, Dickey & Pierce, P.L.C.

(57) ABSTRACT

A data driver is provided that comprises: a state controller that effects transition to any of multiple states including a display ON state, a display OFF state and a sleep state, then outputs a drive control signal associated with a state of a transition destination; and a drive circuit that drive the data lines using drive power corresponding to a drive signal based on the drive control signal. When first setting data is input during the sleep state, the state controller effects transition from the sleep state to the display OFF state, and when second setting data is input during the sleep state and is followed by input of the first setting data, the state controller effects transition from the sleep state to the display OFF state, then effects transition from the display OFF state to the display ON state.

9 Claims, 17 Drawing Sheets

DATA DRIVER AND ELECTRO-OPTIC DEVICE

RELATED APPLICATIONS

This application claims priority to Japanese Patent Application No. 2003-080150 filed Mar. 24, 2003 which is hereby expressly incorporated by reference herein.

BACKGROUND

1. Field of the Invention

The present invention relates to a data driver and an electro-optic device.

2. Description of the Related Art

Display panels, typically in the form of liquid crystal panels, are installed in portable apparatuses such as cellular phones. For this reason, further reduction of consumption power is required for a display panel and a drive circuit, which drives the display panel.

The drive circuit generally includes a digital component and an analog component. Because the digital component is composed of a CMOS (complementary metal oxide semiconductor) circuit, its power consumption can be reduced by an appropriate control, which does not vary signals of the digital component. The power consumption of the analog component of the drive circuit can be reduced by an appropriate control, which shuts off current of a current source, for example.

The drive circuit may have a power circuit for generating drive power and an oscillating circuit for generating a clock for drive control and display control. Such power circuits and oscillating circuits require a certain period to attain steady operation. Moreover, it is necessary to consider product-to-product variations in some cases. This has made it problematic to conduct the above-described fine-tuned control for the drive circuit.

The present invention has been made in consideration of the above-described technical problem, and its purpose is to provide a data driver and an electro-optic device, in which control is simpler and more fine-tuned.

SUMMARY

In order to solve the above-described problem, the present invention relates to a data driver that drives data lines of an electro-optic device, comprising:

a state setting register, to which are input setting data for one of multiple states, which include a display ON state, in which drive power is generated and display operation is conducted using drive signals based on display data, a display OFF state, in which drive power is generated but display operation using the drive signals is not conducted, and a sleep state, in which drive power is not generated and display operation using the drive signals is not conducted;

a state setting circuit, which effects transition to any of the multiple states in accordance with the setting data input to the state setting register and outputs a drive control signal associated with a state of a transition destination; and a drive circuit, which drives the data lines with the drive power based on the drive control signal;

wherein the state setting circuit effects transition from the sleep state to the display OFF state when first setting data are input to the state setting register during the sleep state, and the state setting circuit effects transition from the sleep state to the display OFF state, then effects transition from the display OFF state to the display ON state when second setting data are input to the state setting register and is followed by input of the first setting data to the state setting register during the sleep state.

The drive circuit may drive data lines using any of a plurality of drive power types, selected on the basis of the drive signal, or may supply drive power to a buffer, then drive data lines using power corresponding to the drive signal.

When display operation is conducted, the drive signal can be varied based on the display data, and the data lines can be driven using the drive power. When display operation is not conducted, the drive signal based on the display data can be fixed. When display operation is not conducted, the data lines may be driven in a fixed manner using a predetermined drive power instead of the drive power corresponding to the drive signal, or the data lines may be driven alternately using a predetermined drive power in a polarity reversal cycle.

In the present invention, when the second setting data has been input during the sleep state and then followed by the input of the first setting data, which induces transition from the sleep state to the display OFF state, the state setting circuit effects transition from the sleep state to the display OFF state, then effects transition from the display OFF state to the display ON state.

In general, stable operation of the various circuits within the data driver is required for the display operation conducted in the display ON state. This is because the failure to secure such stable operation leads to degradation of the display quality. Accordingly, the present invention enables transition from the display OFF state to the display ON state automatically. Thus, it can eliminate bothersome appropriately-timed setting by a user, and simplify its control.

Furthermore, because the present invention realizes the above-described automatic transition to the display ON state by making use of setting data, which are not used intrinsically for transition out of the sleep state, and by altering the sequence of these setting data input, control can be simplified without increasing the scale of the circuit.

The data driver of the present invention may also include a counter, which counts the number of frame pulses having a scan cycle of scan lines of the electro-optic device. When the second setting data is input to the state setting register and is followed by input of the first setting data to the state setting register during the sleep state, if the state setting circuit effects transition from the sleep state to the display OFF state, then starts the counting by the counter, and the count value reaches a predetermined number, the state setting circuit may effect transition from the display OFF state to the display ON state.

A counter, which counts the number of frame pulses, is included in the present invention. The frame pulses have a scan cycle for the scan lines, which is generally a value specific to a display system such as 30 Hz or 60 Hz. Based on the number of frame pulses, a period for transition, which is after the transition to the display OFF state and until the transition from the display OFF state to the display ON state, is determined. Therefore, during the display OFF state, it is not required to input setting data for inducing the display ON state with consideration given to a period necessary to attain stable operation of the power circuit and the oscillating circuit. This can further simplify the fine-tuned control for reducing power consumption of the data driver.

Furthermore, as for the data driver of the present invention, the "predetermined number" may be a product of f and Y, in which f being the frequency in Hertz of the frame pulses and Y being the period in milliseconds for the power circuit (for generating the drive power) to stabilize after starting up, or for the oscillating circuit (that outputs the clock for generating the frame pulses) to stabilize after starting oscillation operation.

According to the present invention, without consideration given to a period necessary for stable operation of the power circuit and the oscillating circuit, it is possible to variably set the period by varying Y during the display OFF state. This can further simplify the fine-tuned control for reducing power consumption of the data driver.

The present invention further relates to a data driver that drives data lines of an electro-optic device, comprising:

a state setting register, to which are input setting data for one of multiple states, which include a display ON state, in which drive power is generated and display operation is conducted using drive signals based on display data, a display OFF state, in which drive power is generated but display operation using the drive signals is not conducted, and a sleep state, in which drive power is not generated and display operation using the drive signals is not conducted;

a state setting circuit, which effects transition to any of the multiple states in accordance with the setting data input to the state setting register and outputs a drive control signal associated with a state of a transition destination; and a drive circuit, which drives the data lines with the drive power based on the drive control signal;

wherein the state setting circuit effects transition from the sleep state to the display OFF state when first setting data are input to the state setting register during the sleep state, and the state setting circuit effects transition from the sleep state to the display OFF state, then effects transition from the display OFF state to the display ON state when third setting data are input to the state setting register during the sleep state.

According to the present invention, transition from the display OFF state to the display ON state can be effected automatically. Thus, it can eliminate bothersome appropriately-timed setting by a user, and simplify control.

As for the data driver of the present invention, the state setting circuit may effect transition from the display OFF state to the sleep state when fourth setting data is input to the state setting register during the display OFF state, and the state setting circuit may effect transition from the display ON state to the display OFF state, then may effect transition from the display OFF state to the sleep state when the fourth data is input to the state setting register during the display ON state.

In the present invention, input of the fourth setting data (which induces transition from the display OFF state to the sleep state) during the display ON state results in transition from the display ON state to the display OFF state, followed by transition from the display OFF state to the sleep state.

Therefore, bothersome operation, such as inputting a predetermined setting data during the display ON state to effect the display OFF state, followed by inputting the fourth setting data to effect transition to the sleep state, is eliminated. Thus, it can eliminate bothersome appropriately-timed setting by a user, and simplify control.

The present invention further relates to a data driver that drives data lines of an electro-optic device, comprising:

a state setting register, to which are input setting data for one of multiple states, which include a display ON state, in which drive power is generated and display operation is conducted using drive signals based on display data, a display OFF state, in which drive power is generated but display operation using the drive signals is not conducted, and a sleep state, in which drive power is not generated and display operation using the drive signals is not conducted;

a state setting circuit, which effects transition to any of the multiple states in accordance with the setting data input to the state setting register and outputs a drive control signal associated with a state of a transition destination; and a drive circuit, which drives the data lines with the drive power based on the drive control signal;

wherein the state setting circuit effects transition from the display OFF state to the sleep state when fourth setting data are input to the state setting register during the display OFF state, and the state setting circuit first effects transition from the display ON state to the display OFF state, then effects transition from the display OFF state to the sleep state when fourth setting data are input to the state setting register during the display ON state.

In the present invention, input of the fourth setting data (which induces transition from the display OFF state to the sleep state) during the display ON state results in transition from the display ON state to the display OFF state, followed by transition from the display OFF state to the sleep state. Thus, after effecting the display OFF state by inputting a predetermined setting data during the display ON state, transition from the display ON state to the sleep state can be effected without inputting the fourth setting data for effecting transition to the sleep state. Thus, it can eliminate bothersome operation, such as when appropriately-timed setting by a user is required, from a user, and simplify control.

The present invention further relates to an electro-optic device that includes a plurality of scan lines, a plurality of data lines, a plurality of pixels coupled to the plurality of scan lines and the plurality of data lines, a scan driver for driving the plurality of scan lines, and any of the above-described data drivers for driving the plurality of data lines.

The present invention further relates to an electro-optic device that includes: a display panel including a plurality of scan lines, a plurality of data lines, and a plurality of pixels coupled to the plurality of scan lines and the plurality of data lines; a scan driver for driving the plurality of scan lines; and any of the above-described data drivers for driving the plurality of data lines.

According to the present invention, an electro-optic device, which permits fine-tuned control for reducing power consumption without consideration given to the input timing for the setting data that induce the state transitions, can be provided.

DETAILED DESCRIPTION

Hereinafter, preferred embodiments of the present invention will be described in detail with reference to the drawings. The embodiments described below should not be construed to unduly limit the scope of the present invention as set forth in the claims. Nor do all the configurations described below necessarily represent essential configurational requirements for the present invention.

1. Electro-Optic Device

Figure 1A:
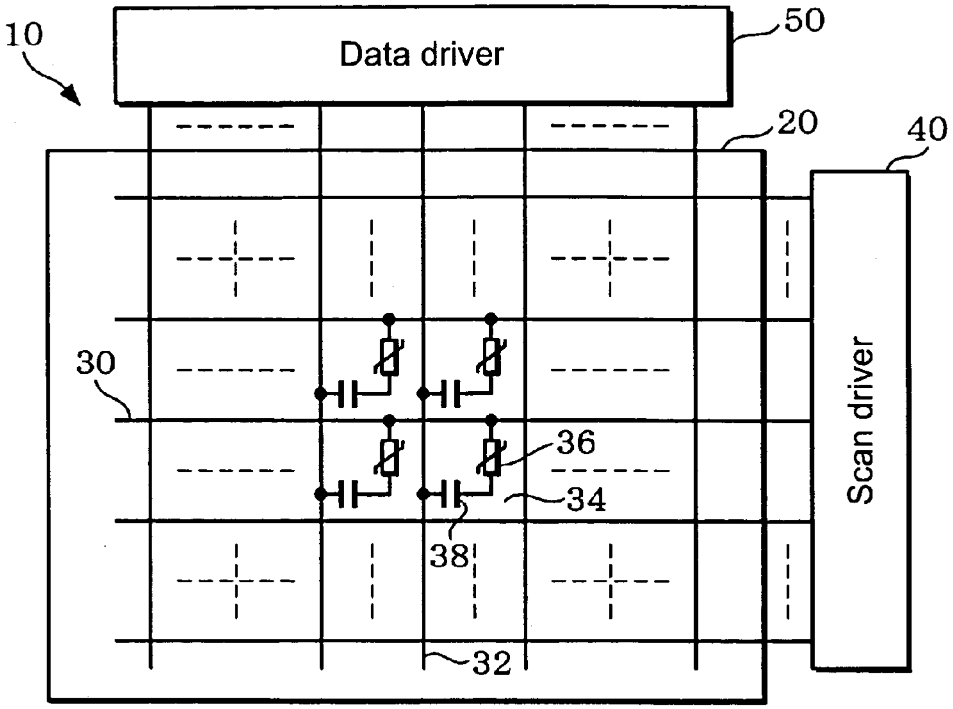
FIGS. 1(A) and (B) show equivalent circuit diagrams of example configurations of an electro-optic device.

FIGS. 1(A) and (B) show equivalent circuits for example configurations of an electro-optic device 10. The electro-optic device 10 includes a display panel 20. As shown in FIG. 1(A), an active matrix type display panel employing a TFD (more broadly, 2-terminal nonlinear elements) can be used for the display panel 20.

The display panel 20 includes a plurality of scan lines 30 and a plurality of data lines 32. The plurality of scan lines 30 are scanned by a scan driver 40. The plurality of data lines 32 are driven by a data driver 50. Within each pixel domain 34, a TFD 36 and an electro-optic material (liquid crystal) 38 are coupled in series between each of scan lines 30 and data lines 32.

In the display panel 20, display operation is controlled by switching the electro-optic material 38 among a display state, a non-display state and an intermediate state based on signals that are applied to the scan lines 30 and the data lines 32. Although in FIG. 1(A), the TFD 36 is coupled to each of the scan lines 30 and the electro-optic material 38 is coupled to each of the data lines 32, the opposite configuration, in which the TFD 36 is coupled to each of the data lines 32 and the electro-optic material 38 is coupled to each of the scan lines 30, is possible.

Figure 1B:
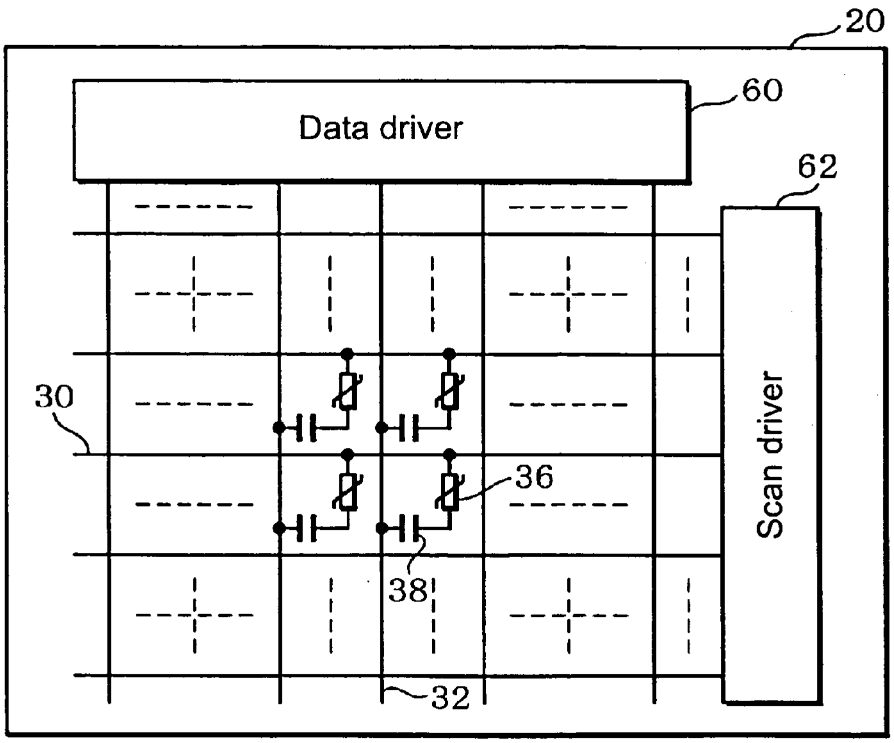

As shown in FIG. 1(B), the display panel may be configured so that at least one of a data driver 60 and a scan driver 62 is formed on the glass substrate, on which the pixels are formed. The data driver 60 has similar functions to the data driver 50. The scan driver 62 has similar functions to the scan driver 40. For example, the display panel 20 includes the plurality of scan lines 30, the plurality of data lines 32, the plurality of pixels coupled to the plurality of scan lines 30 and plurality of data lines 32, the scan driver 62 that scans the plurality of scan lines 30, and the data driver 60 that drives the plurality of data lines 32. In this case, the display panel 20 can be termed as an electro-optic device, and with a drastic reduction of the packaging area, it can contribute to the compactness and light-weight of electronic apparatuses.

In FIGS. 1(A) and (B), the active matrix type panel employs TFD, but it is by no means limited to those, and an active matrix panel with a three-terminal element such as TFT or another type of a two-terminal element may be used. The panel may also be a passive matrix type display panel.

2. Data Driver

Figure 2:
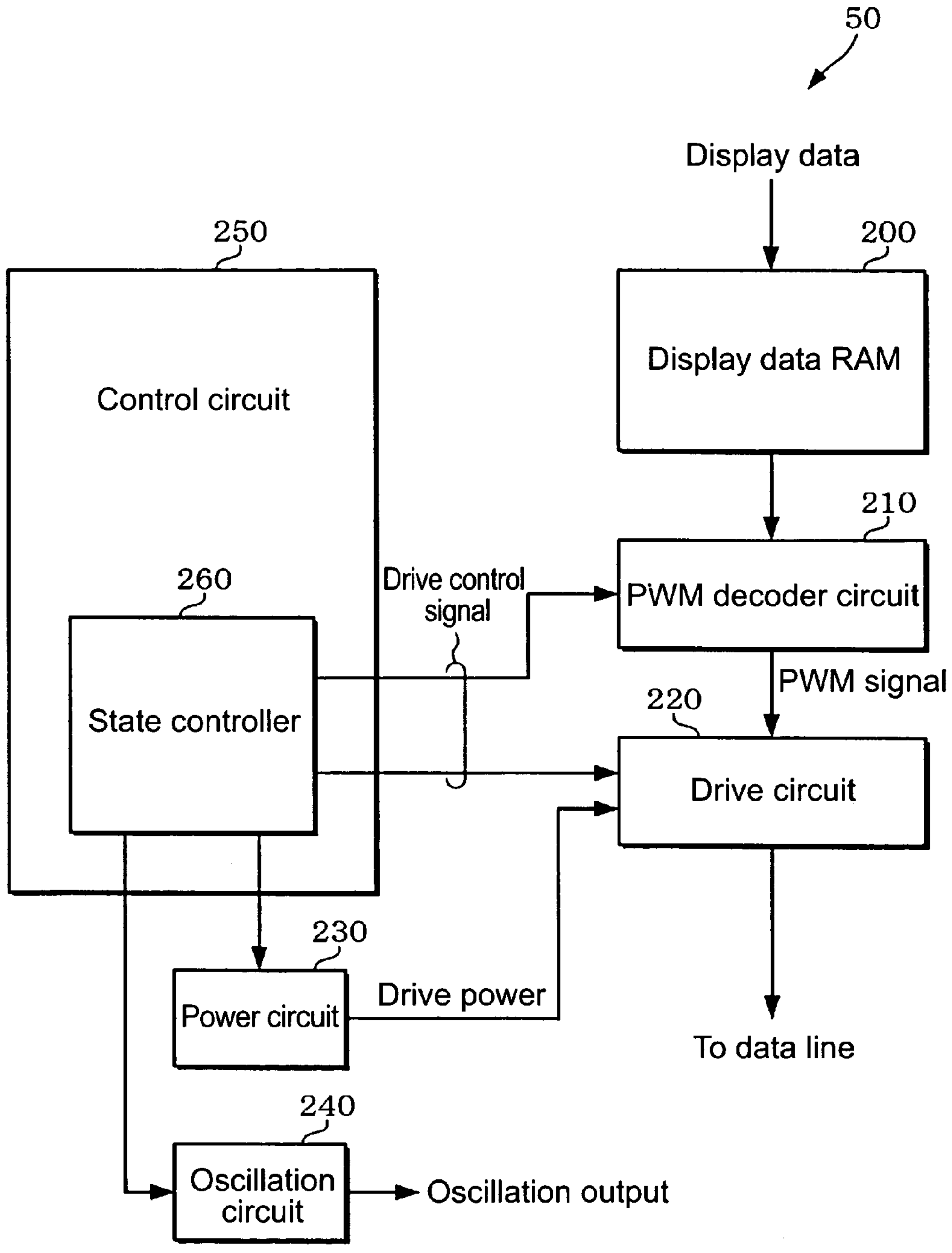
FIG. 2 shows a block diagram illustrating a schematic configuration of a data driver.

FIG. 2 shows a schematic configuration of the data driver 50. The data driver 50 includes a display data RAM 200, a pulse width modulation (PWM) decoder circuit 210, a drive circuit 220, a power circuit 230, an oscillating circuit 240, and a control circuit 250 that controls the above-described circuits.

The display data RAM 200 memorizes one frame worth of display data. Display data are written into the display data RAM 200 by an external host. The data driver 50 drives the data lines based on the display data that are memorized in the display data RAM 200.

The display data that are read from the display data RAM 200 are supplied to the PWM decoder circuit 210. The PWM decoder circuit 210 generates a PWM signal (drive signal) with a pulse width corresponding to the display data. The drive circuit 220 drives the data lines with drive power corresponding to the PWM signal generated by the PWM decoder circuit 210.

The power circuit 230 generates drive power for driving the data lines by the drive circuit 220. Generation of drive power by the power circuit 230 starts or stops based on control signals from the control circuit 250.

The oscillating circuit 240 generates an oscillation output (clock) for generating each timing for the data driver 50. Based on the oscillation output, the dot clock, the frame pulse that specifies the vertical scan period, and the latch pulse that specifies the horizontal scan cycle are generated. Oscillation operation of the oscillating circuit 240 starts or stops based on control signals from the control circuit 250.

Besides control of the above-described power circuit 230 and oscillating circuit 240, the control circuit 250 also conducts control of reading of display data from the display data RAM 200. In addition, the control circuit 250 outputs drive control signals to the PWM decoder circuit 210 and the drive circuit 220 so as to conduct drive control for the data lines, control for stopping logic signal operation of the PWM decoder circuit 210 and drive circuit 220, and control for stopping of current for an analog circuit.

Figure 3:
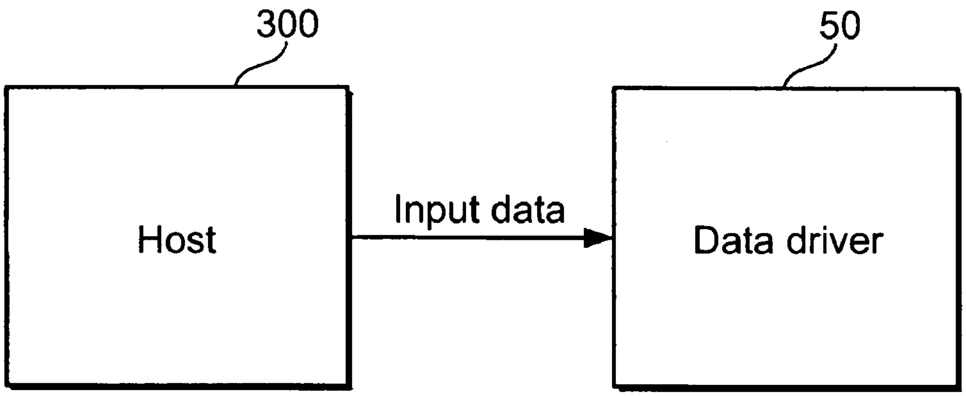
FIG. 3 shows a diagram of a data driver and a host.

As shown in FIG. 3, drive control of the data lines by the data driver 50 is conducted by a host 300 such as micro processor unit (MPU) or the like. As shown in FIG. 3, the host generates display data for driving the display panel, supplies them to the data driver 50, and instructs display control such as display start and display stop to the data driver 50.

The data driver 50 conducts fine-tuned control for reducing its power consumption by making transitions among multiple states, in which each state conducts a pre-determined control. For this reason, the data driver 50 receives a command, which is input by setting data from the host 300, and effects transition to the state corresponding to the command in question.

Accordingly, the control circuit 250 includes a state controller 260. The state controller 260 controls transitions among the multiple states. The state controller 260 outputs various control signals such as drive control signals for conducting drive control, depending on the state of a transition destination. The display data RAM 200, the PWM decoder circuit 210, the drive circuit 220, the power circuit 230 and the oscillating circuit 240 are controlled based on such control signals.

Either the power circuit 230 or the oscillating circuit 240, or both, may be externally mounted instead of being built into the data driver 50. Even in this case, the externally mounted circuit is controlled by the control signals from the state controller 260.

Figure 4:
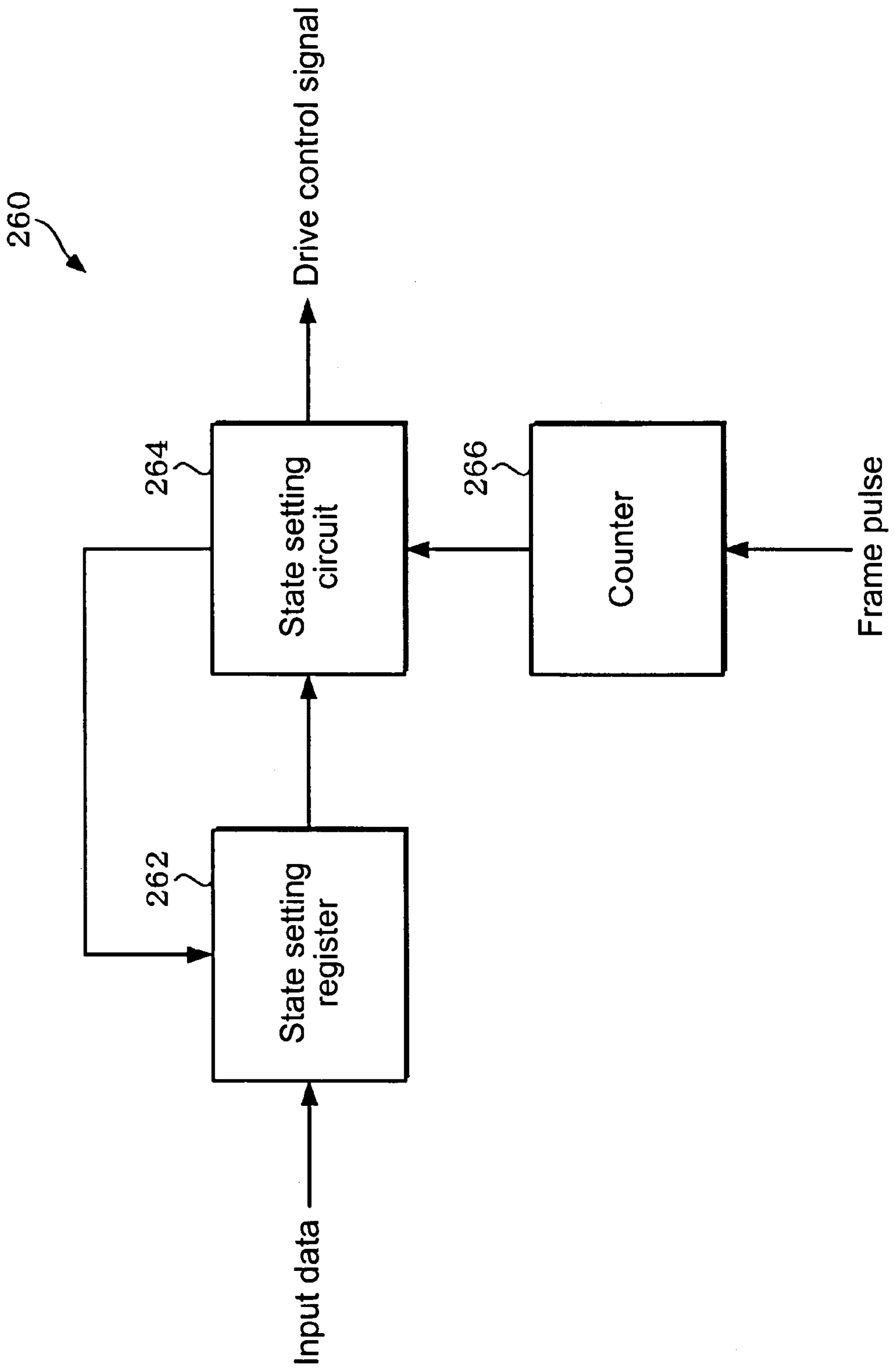
FIG. 4 shows a block diagram illustrating a schematic configuration of a state controller.

FIG. 4 shows a schematic view of the configuration of the state controller 260. The state controller 260 includes a state setting register 262 and a state setting circuit 264. When setting data for inducing one of the multiple states are input, the state setting circuit 264 effects transition to one of the multiple states in accordance with the setting data input to the state setting register 262, and outputs a drive control signal associated with a state of a transition destination. The drive circuit 220 drives the data lines using drive power that corresponds to the drive signal based on the drive control signal that is output by the state setting circuit 264 and associated with a state of a transition destination.

The state controller 260 can include a counter 266. The counter 266 counts the number of frame pulses having a scan cycle for the scan lines of the display panel 20. In this case, the state setting circuit 264 can effect transition from a first state to a second state based on the count value of the counter 266.

Hereinafter, the state controller 260 will be described in more specific detail.

The multiple states, whose transitions are controlled by the state controller 260, include the display ON state, the display OFF state and the sleep state.

Figure 5:
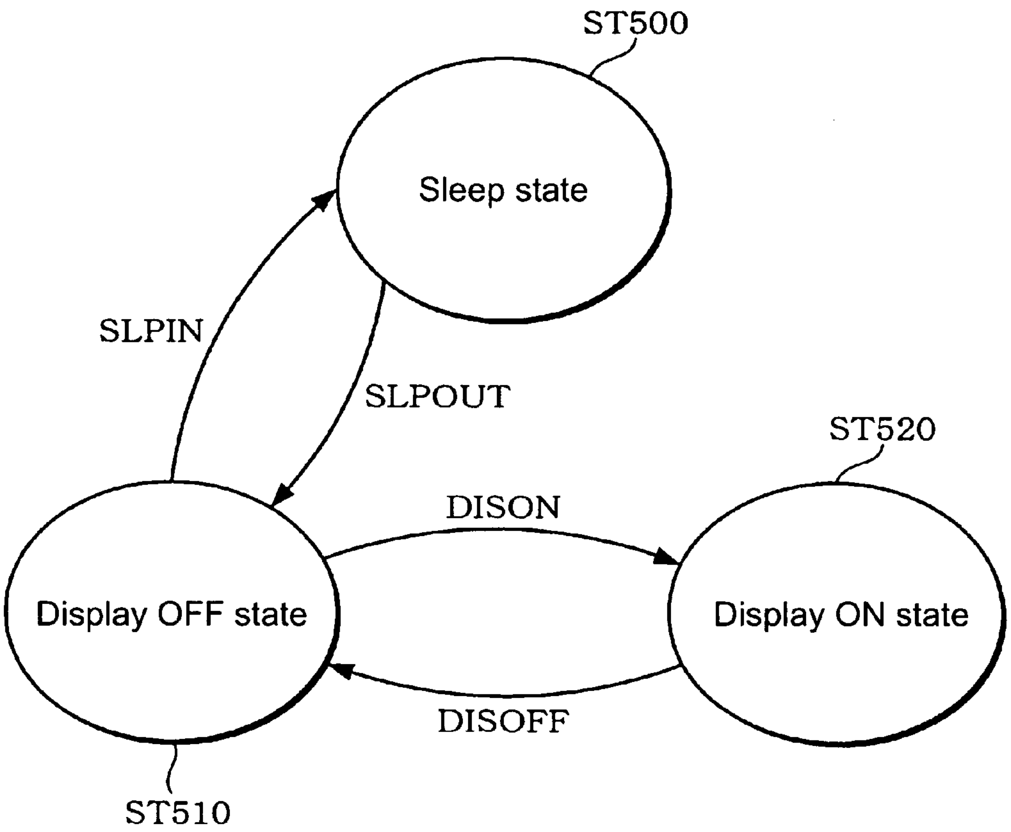
FIG. 5 shows a diagram illustrating an example of state transitions controlled by a state controller.

FIG. 5 shows an example of state transitions controlled by the state controller 260. For simplicity of description, an example, where drive control of the data driver is conducted using transition among three states: the sleep state, the display OFF state and the display ON state, is shown.

In the sleep state ST500, the data driver 50 does not generate drive power and hence does not conduct any display operations using drive signals. That is, generation of drive power by the power circuit 230 is stopped, and oscillation operation of the oscillating circuit 240 is stopped.

In the display ON state ST510, the data driver 50 generates drive power and conducts display operations using drive signals. That is, drive power is generated by the power circuit 230, and the oscillating circuit 240 conducts oscillation operation.

In the display OFF state ST520, the data driver 50 generates drive power, but does not conduct any display operations using drive signals. That is, drive power is generated by the power circuit 230, but oscillation operation by the oscillating circuit 240 is stopped.

As shown in FIG. 3, the data driver 50 can transit to any of the sleep state ST500, the display ON state ST510 or the display OFF state ST520 by commands corresponding to the setting data that are input by the host 300.

More specifically, when in the sleep state ST500, the data driver 50 transits to the display OFF state ST510 in response to a SLPOUT command input by the host 300. Similarly, when in the display OFF state ST510, the data driver 50 transits to the sleep state ST500 in response to a SLPIN command, or to the display ON state ST520 in response to a DISON command, the command in either case being input by the host 300. When in the display ON state ST520, the data driver 50 transits to the display OFF state ST510 in response to a DISOFF command input by the host 300.

However, the power circuit 230 and oscillating circuit 240 require a certain time to attain stable operation before they can be controlled, which means that the above-described commands must be input from the host 300 with appropriate timing in order to effect transitions shown in FIG. 5.

Moreover, the state controller 260 prescribes transition commands for each state. For example, the SLPOUT command is prescribed as the transition command for the sleep state. Therefore, even if the SLPIN command, the DISON command, or the DISOFF command are input during the sleep state, no direct transition to the states corresponding to those commands is effected.

As for the state controller 260, a control is conducted as follows. On a condition that a command other than the prescribed transition command for a predetermined state is input to the predetermined state, the state is transited to a state corresponding to the prescribed transition command at first when the prescribed transition command is input, then transited to a state corresponding to a command other than the prescribed transition command.

As for the state controller 260, a control is conducted as follows. When a command other than the prescribed transition command for a predetermined state is input to the predetermined state, the state is transited to a state corresponding to the prescribed transition command at first, then transited to a state corresponding to a command other than the prescribed transition command.

Figure 6A:
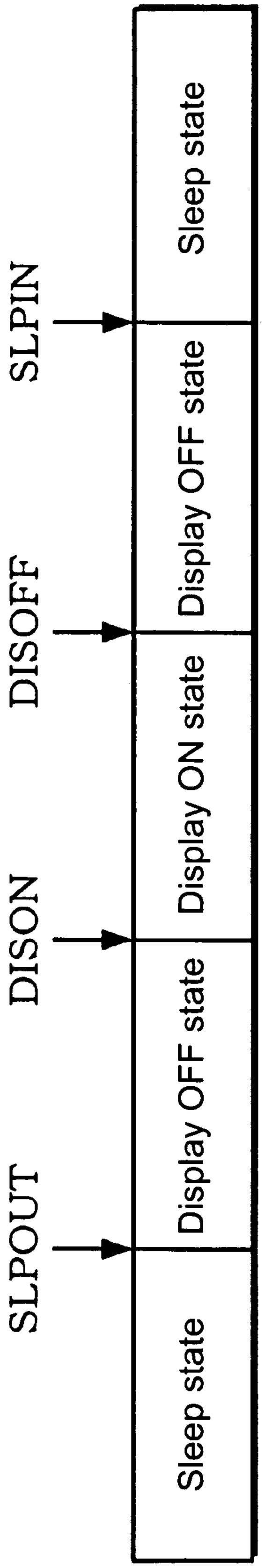
FIGS. 6(A) and (B) show schematic diagrams illustrating state transitions in response to transition commands that are input in each state.
Figure 6B:
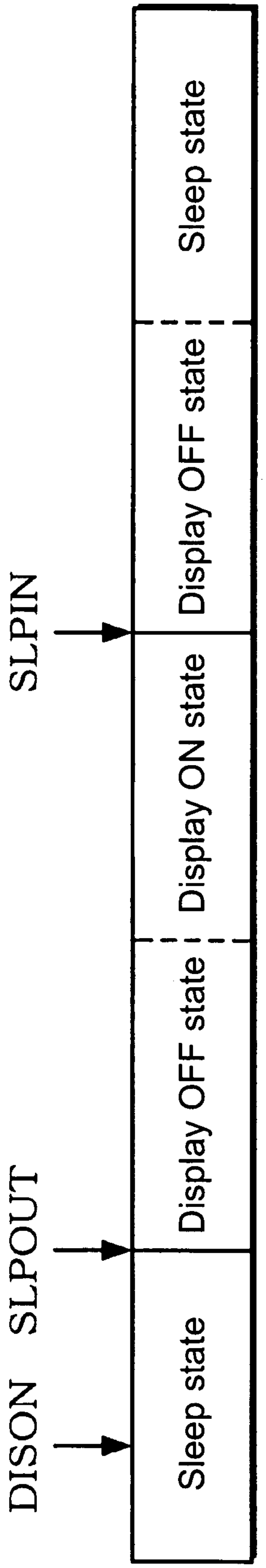

FIGS. 6(A) and (B) show schematically the transitions in response to transition commands input in various states. FIG. 6(A) shows schematically the state transitions when transition commands are input in the various states shown in FIG. 5. FIG. 6(B) shows schematically the state transitions when a command other than the prescribed transition command is input before the prescribed transition command is input by altering the order of command input to the states shown in FIG. 5.

In FIG. 6(A), as shown in FIG. 5, the state transits to the display OFF state by inputting an SLPOUT command during the sleep state, for example. The state transits to the display ON state by a DISON command during the display OFF state, for example.

In FIG. 6(B), on the other hand, when a DISON command is input to the sleep state, the state does not transit to any states in the state transition diagram shown in FIG. 5. However, when the SLPOUT command is input to the sleep state on a condition that a DISON command has already been input to the sleep state, the state transits to the display OFF state, and followed by an automatic transition to the display ON state without a fresh DISON command being input. In this way, bothersome command input can be avoided.

Similarly, when a SLPIN command is input to the display ON state, the state transits to the display OFF state, and followed by an automatic transition to the sleep state without a fresh SLPIN command being input.

Thus, when a setting data corresponding to the SLPOUT command (first setting data) is input to the state setting register 262 during the sleep state, the state setting circuit 264 of the state controller 260 effects transition from the sleep state to the display OFF state. When a setting data corresponding to the DISON command (second setting data) is input to the state setting register 262 during the sleep state, and subsequently a setting data corresponding to the SLPOUT command (first setting data) is input to the state setting register 262, the state setting circuit 264 effects transition from the sleep state to the display OFF state, then effects transition from the display OFF state to the display ON state.

For this reason, bothersome appropriately-timed input of commands from the host can be eliminated and control can be simplified.

The state setting circuit 264 may effect transition from the display OFF state to the display ON state using the counter 266. More specifically, when setting data corresponding to the SLPOUT command (first setting data) are input to the state setting register 262 after setting data corresponding to the DISON command (second setting data) are input to the state setting register 262 during the sleep state, the state setting circuit 264 may effect transition from the sleep state to the display OFF state, then effect transition from the display OFF state to the display ON state based on a count value of the counter 266.

Still more specifically, transition from the display OFF state to the display ON state may be effected on a condition that the counter 266 starts to count after the above-described transition from the sleep state to the display OFF state is effected and the count value reaches a predetermined number. In this case, the count value is a product of f and Y, in which f being the frequency in Hertz of the frame pulses and Y being the period in milliseconds for the power circuit 230 to stabilize after starting up, or for the oscillating circuit 240 (that outputs the clock for generating the frame pulses) to stabilize after starting oscillation operation. The count value for the counter 266 can be made variable by providing a setting register for setting Y and enabling access to the setting register by the host.

By using a counter, which counts the number of frame pulses to effect the transition from the display OFF state to the display ON state, it becomes unnecessary for inputting the DISON command from the host with consideration given to a period necessary for the power circuit and the oscillating circuit to attain stable operation during the display OFF state. This can further simplify the fine-tuned control for reducing the power consumption of the data driver 50.

The state setting circuit 264 may effect transition from the sleep state to the display OFF state, then effect transition from the display OFF state to the display ON state when third setting data, distinct from the first and second setting data, are input to the state setting register 262 during the sleep state. In this case, it is also possible to obtain the same effects as in the above-described cases. However, the scale of the circuit is increased because it is necessary to decode the third setting data in addition to the first and second setting data.

In addition, when setting data corresponding to the SLPIN command (fourth setting data) are input to the state setting register 262 during the display OFF state, the state setting circuit 264 of the state controller 260 effects transition from the display OFF state to the sleep state. Moreover, when setting data corresponding to the SLPIN command (fourth setting data) is input to the state setting register 262 during the display ON state, the state setting circuit 264 effects transition from the display ON state to the display OFF state, then effects transition from the display OFF state to the sleep state.

Also in this case, bothersome appropriately-timed input of commands from the host can be eliminated and control can be simplified.

Next, a detailed description of example configurations of the state controller 260, and the PWM decoder circuit 210 and the drive circuit 220 that are controlled by the state controller 260 will be explained.

Figure 7:
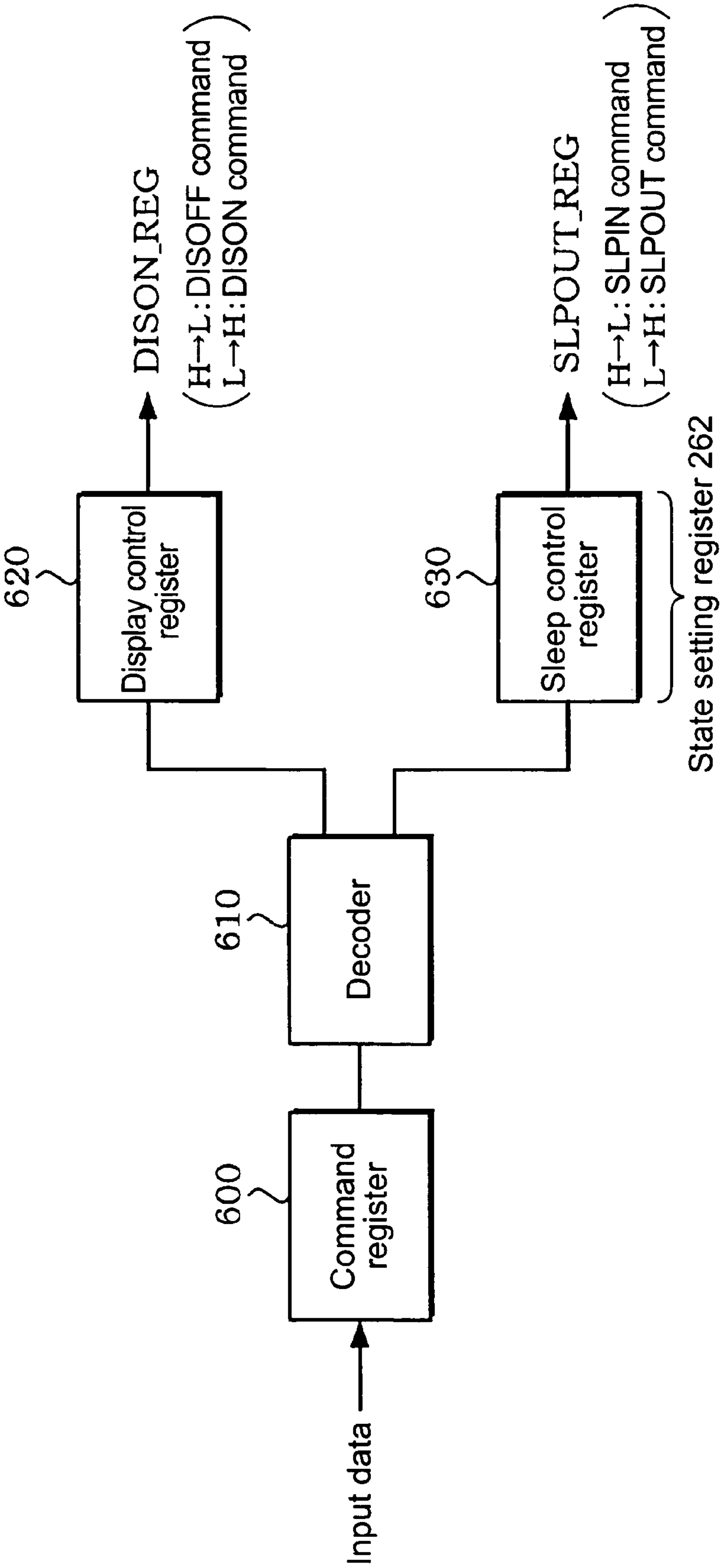
FIG. 7 shows a block diagram illustrating a schematically configuration of a command input unit.

FIG. 7 shows a schematic view of the configuration of a command input unit for inputting the setting data to the state setting register 262. The command input unit is included in the control circuit 250 or in the state controller 260. The command input unit includes a command register 600, a decoder 610, a display control register 620 and a sleep control register 630. The display control register 620 and the sleep control register 630 are equivalent to the state setting register 262 shown in FIG. 4.

The command register 600 registers commands from the host 300 as input data. The decoder 610 decodes the input data registered in the command register 600.

When the input data registered in the command register 600 are determined to be the DISON command or the DISOFF command by the decoder 610, data corresponding to such commands are registered in the display control register 620. In case of the DISON command, "1" is registered in the display control register 620, while in case of the DISOFF command, "0" is registered in the display control register 620. The input of the display control register 620 is output as DISON_REG signal. Accordingly, when the DISON_REG signal changes from the "H" level to the "L" level, it signifies that the DISOFF command has been registered. Conversely, when the DISON_REG signal changes from the "L" level to the "H" level, it signifies that the DISON command has been registered.

When the input data registered in the command register 600 is determined to be the SLPOUT command or the SLPIN command by the decoder 610, data corresponding to such command are registered in the sleep control register 630. In case of the SLPOUT command, "1" is registered in the sleep control register 630, while in case of the SLPIN command, "0" is registered in the sleep control register 630. The input of the sleep control register 630 is output as SLPOUT_REG signal. Accordingly, when the SLPOUT_REG signal changes from the "H" level to the "L" level, it signifies that the SLPIN command has been registered. Conversely, when the SLPOUT_REG signal changes from the "L" level to the "H" level, it signifies that the SLPOUT command has been registered.

Figure 8:
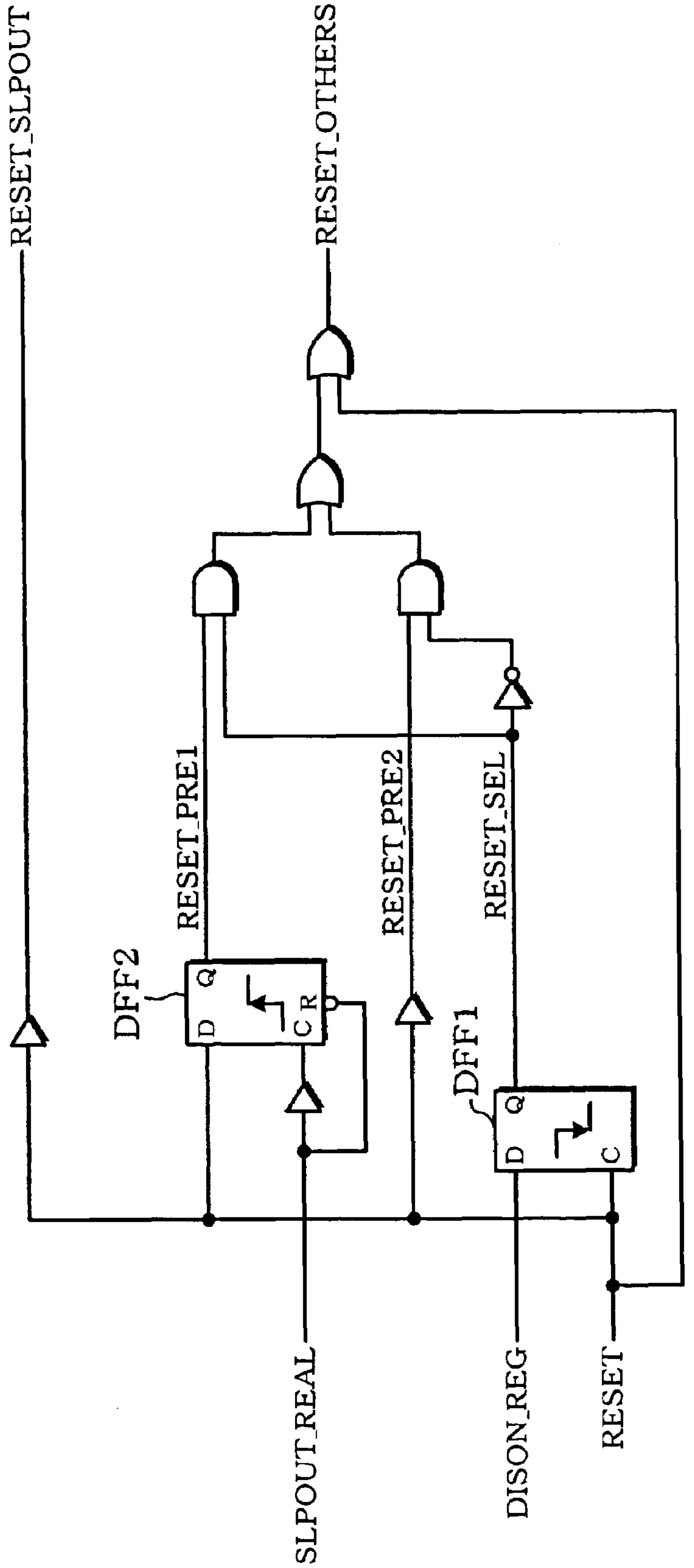
FIG. 8 shows a circuit diagram illustrating an example configuration of major constituents of a state setting circuit.
Figure 9:
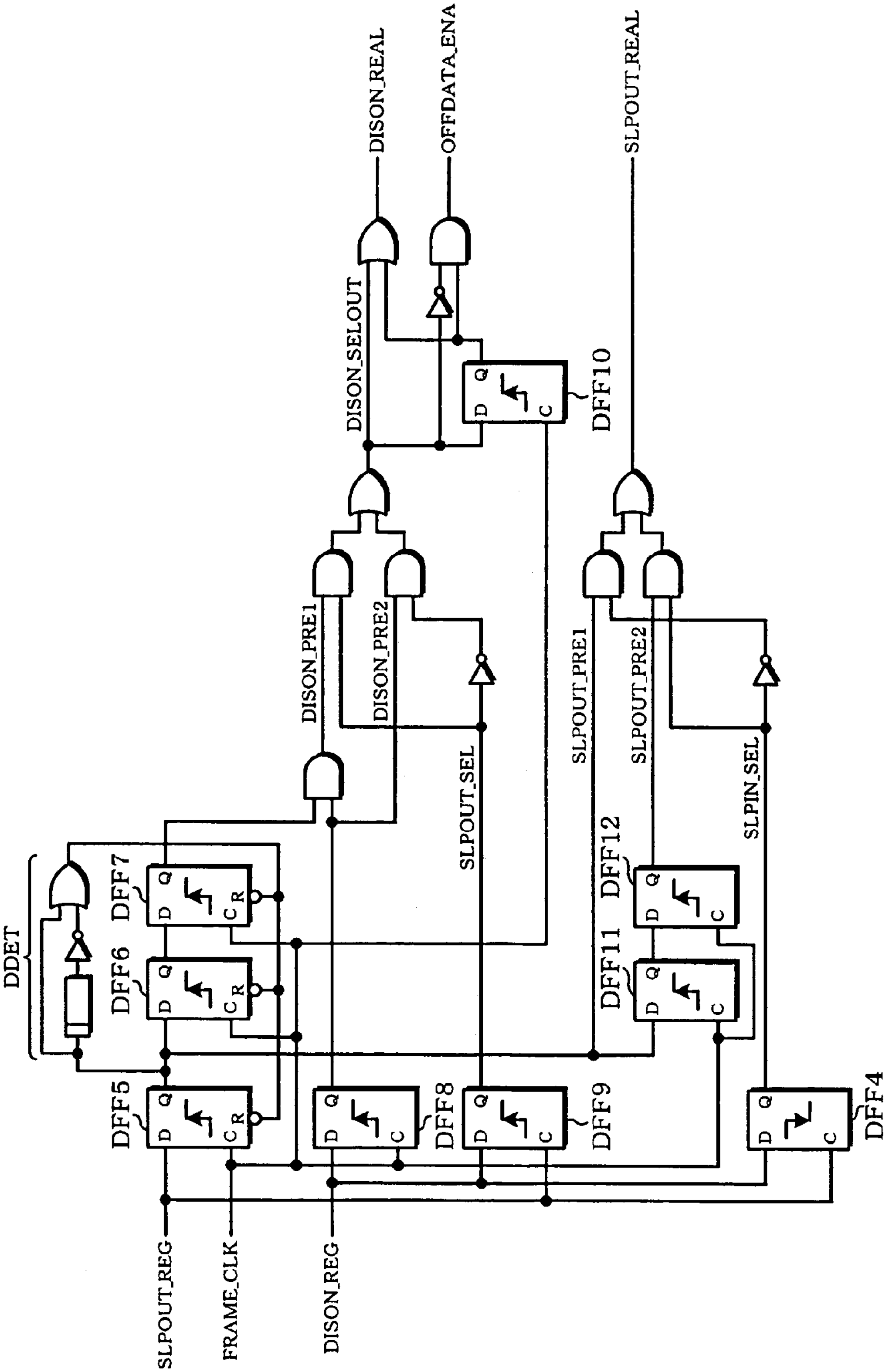
FIG. 9 shows a circuit diagram illustrating another example configuration of major constituents of a state setting circuit.

FIGS. 8 and 9 show major constituents of example configurations of the state setting circuit 264. In FIG. 8, the RESET signal is an initializing signal used as the display stopping signal, and is active at the "L" level. A SLPOUT_REAL signal is generated by a circuit shown in FIG. 9. The DISON_REG signal is a signal corresponding to the setting of the display control register 620 shown in FIG. 7.

DFF1 takes in the DISON_REG signal when the RESET signal falls, and outputs a RESET_SEL signal.

DFF2 takes in the RESET signal when the SLPOUT_REAL signal, which is input via a buffer, rises, and outputs a RESET_PRE1 signal. DFF2 is reset when the SLPOUT_REAL signal is at the "L" level.

A RESET_PRE2 signal is the output signal of a buffer, to which the RESET signal is input. A RESET_OTHERS signal is the logical sum of one of the RESET_PRE1 and the RESET_PRE2 signal selected on the basis of the RESET_SEL signal, and the RESET signal. A RESET_SLPOUT signal is the output signal of a buffer, to which the RESET signal is input.

When the RESET_SLPOUT signal is at the "L" level, only the sleep control register 630 is initialized. The RESET_OTHERS signal initializes the display control register 620 and other control registers (not shown), excluding the sleep control register 630.

In FIG. 9, a FRAME_CLK signal corresponds to the frame pulse. The SLPOUT_REG signal is a signal corresponding to the input of the sleep control register 630 shown in FIG. 7.

DFF4 takes in the DISON_REG signal when the SLPOUT_REG signal falls, and outputs it as a SLPIN_SEL signal. Falling of the SLPOUT_REG signal signifies that the SLPIN command has been input. Therefore, DFF4 outputs the DISON_REG signal as the SLPIN_SEL signal when the SLPIN command is input.

DFF5 takes in the SLPOUT_REG signal when the FRAME_CLK signal rises, and outputs it as an SLPOUT_PRE1 signal. DFF6 takes in the SLPOUT_PRE1 signal when the FRAME_CLK signal rises. DFF7 takes in the output signal of DFF6 when the FRAME_CLK signal rises. A falling edge detection circuit DDET detects the falling edge of the SLPOUT_PRE1 signal, and output the result as a pulse. When the pulse is at the "L" level, DFF5 and DFF6 are initialized.

DFF8 takes in the DISON_REG signal when the FRAME_CLK signal rises, and outputs it as a DISON_PRE2 signal. The logical product of the output signal of DFF7 and the DISON_PRE2 signal becomes the DISON_PRE1 signal. DFF9 takes in the DISON_REG signal when the SLPOUT _REG signal rises, and outputs it as a SLPOUT_SEL signal.

The DISON_PRE1 signal changes to the "H" level, if a DISON command is input when three frames have elapsed from the frame where the SLPOUT command was input. The DISON_PRE2 signal changes to the "H" level in the next frame after the one where the DISON command was input. The SLPOUT_SEL signal indicates whether or not the DISON command has been input when the SLPOUT command is input. In FIG. 9, the DISON_PRE1 signal is selected and output as the DISON_SELOUT signal, if a DISON command has been input when the SLPOUT command is input, while the DISON_PRE2 signal is selected and output as the DISON_SELOUT signal, if a DISON command has not been input when the SLPOUT command is input.

DFF10 takes in the DISON_SELOUT signal when the FRAME_CLK signal rises. The logical sum of the output signal of DFF10 and the DISON_SELOUT signal becomes the DISON_REAL signal. The logical product of the output signal of DFF10 and the inverted signal of the DISON_SELOUT signal becomes an OFFDATA_ENA signal.

In other words, the DISON_REAL signal is a signal, in which the DISON_SELOUT signal is extended by just one frame. The OFFDATA_ENA signal is a signal that changes to the "H" level just for the one frame that comes after falling of the DISON_SELOUT signal.

DFF11 takes in the SLPOUT_PRE1 signal when the FRAME_CLK signal rises. DFF12 takes in the output signal of DFF11 when the FRAME_CLK signal rises, and outputs it as the SLPOUT_PRE2 signal.

The SLPOUT_REAL signal is a signal, which is selectively output either the SLPOUT_PRE1 signal or the SLPOUT_PRE2 signal according to the SLPIN_SEL signal.

FIG. 9 shows a configuration, in which transition to the display ON state is effected after three frames have elapsed, using shift registers as the counter 266. Thus, DFF5 through DFF7 in FIG. 9 are equivalent to the counter 266 in FIG. 4.

Figure 10:
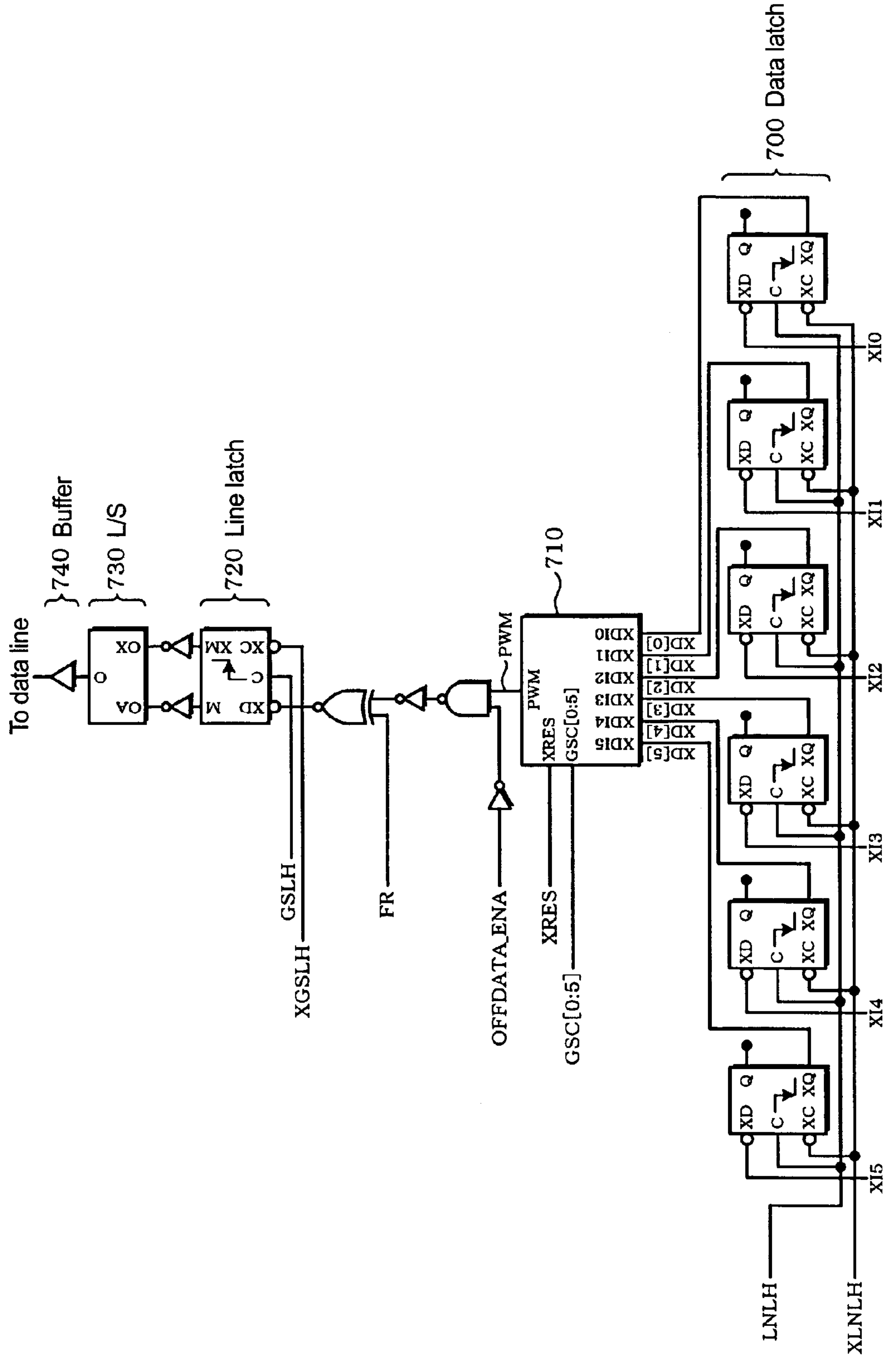
FIG. 10 shows a circuit diagram illustrating an example configuration of a PWM decoder circuit and a drive circuit in FIG. 2.

FIG. 10 shows an example configuration of the PWM decoder circuit 210 and the drive circuit 220 shown in FIG. 2. Only the configuration of the output of one data line is shown here, but the outputs of the other data lines have a similar configuration. In FIG. 10, inverted display data X15 through X10, which are the results of inversion of display data configuring six bits for one dot, are taken into a data latch 700 from the display data RAM 200. When display data are "101010 (=2Ah)", the inverted display data X15 through X10 become "010101 (=15h)". The data latch 700 takes in the inverted display data X15 through X10 when the latch enable LNLH rises (when the inverted signal XLNLH of the latch enable LNLH falls). The latch enable LNLH has a change point, in which it changes at an earlier timing than the change point of latch pulse LP. The display data, taken into the data latch 700 based on the latch enable LNLH (the inverted signal XLNLH of the latch enable LNLH), is supplied to the PWM decoder circuit 710.

The PWM decoder circuit 710 is a coincidence detection circuit. A gradation reset signal XRES and a six-bit gradation count GSC [5:0] are supplied to the PWM decoder circuit 710. The gradation reset signal XRES changes to the "L" level each time that a horizontal scan cycle starts. The gradation count GSC [5:0] is initialized by the gradation reset signal XRES. The gradation count GSC [5:0] is incremented by a gradation clock during each horizontal scan cycle.

In FIG. 10, the inverted display data X15 through X10, XF [5:0 ], and the PWM signal may be termed as the drive signals, while the gradation count GSC [5:0], the latch enable LNLH (XLNLH), and the OFFBATA_ENA signal may be termed as the drive control signals. Because the buffer 740 consists of ordinary operational amplifiers, on/off control for shut-off of the steady-state current of a current source is preferably conducted by drive control signals (not shown).

Figure 11:
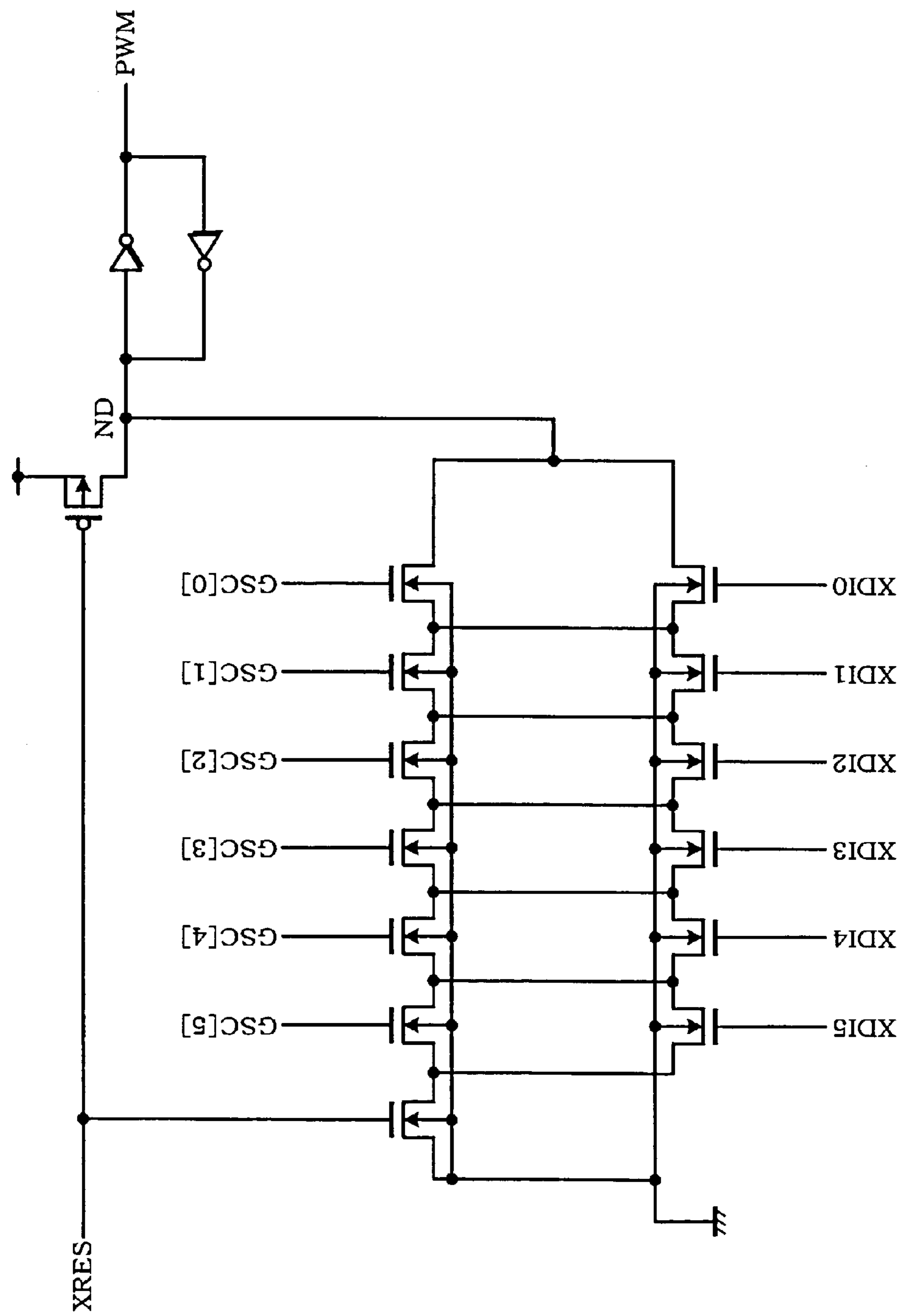
FIG. 11 shows a circuit diagram illustrating an example configuration of a PWM decoder circuit shown in FIG. 10.

FIG. 11 shows an example configuration of the PWM decoder circuit 710. The PWM decoder circuit 710 detects coincidence of the inverted display data X15 through X10 with the gradation counter GSC [5:0]. The "coincidence detection" refers to detecting that the bits of the inverted display data X15 through X10 and the bits of the gradation counter GSC [5:0] are mutually complementary. However, such detection may be alternatively conducted by detecting states that are equivalent to coincidence between two values with the bit-level detection whether the two values to be compared are equal or not.

When the bits of the inverted display data X15 through X10 and the bits of the gradation counter GSC [5:0] are mutually complementary, a node ND that has been precharged by the gradation reset signal XRES changes to the "L" level. Because the logical level of the node ND is retained by a flip-flop, the PWM signal changes from the "L" level to the "H" level when the bits of the inverted display data X15 through X10 and the bits of the gradation counter GSC [5:0] are mutually complementary. As a result, the PWM signal can possess a pulse width corresponding to the gradation value used as the display data.

Figure 12:
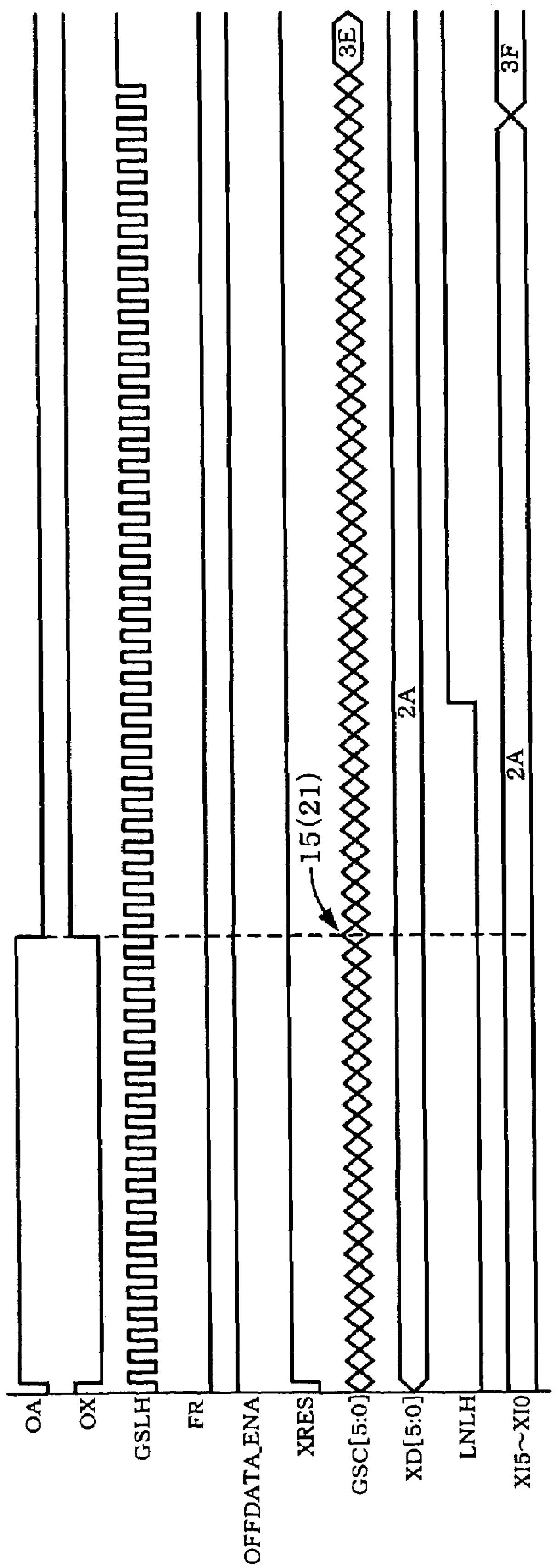
FIG. 12 shows a timing diagram of an example operation of circuits shown in FIGS. 10 and 11.

FIG. 12 shows an example of operation of the circuits shown in FIGS. 10 and 11. The example assumes that the inverted display data X15 through X10 are "101010 (=2Ah)". When the gradation reset signal XRES changes to the "L" level, the gradation count GSC [5:0] is incremented, starting from its initialized state, and when the gradation count GSC [5:0] reaches "010101 (=15h)", the bits of the gradation count GSC [5:0] becomes mutually complementary with the bits of the inverted display data X15 through X10. Therefore, when the gradation count GSC [5:0] is "010101 (=15h)", the PWM signal changes to the "H" level.

In FIG. 10, the PWM signal, which is output from the PWM decoder circuit 710, is masked by an inverted signal of the OFFDATA_ENA signal. Therefore, the pulse width of the masked signal can be a pulse width corresponding to the gradation value of 0 by the OFFDATA_ENA signal. By using the OFFDATA_ENA signal for masking in this way, a drive voltage corresponding to the OFF data can be output by a simple configuration without having the PWM decoder circuit 710 generate a pulse width corresponding to the gradation value of 0.

The masked signal undergoes, for example, frame inversion based on a polarity reversal signal FR. The frame-inverted signal is taken into the line latch 720. The line latch 720 takes in the frame-inverted signal based on a gradation latch enable signal GSLH and the inverted signal XGSLH. The level of the signal taken into the line latch 720 is converted by an L/S 730. The output of L/S 730 is input to a buffer 740. The output of the buffer 740 is coupled to the data lines.

Next, the operation of the circuits shown in FIG. 8 and FIG. 9 that conduct drive control of the PWM decoder circuit 210 and the drive circuit 220 will be described.

Figure 13:
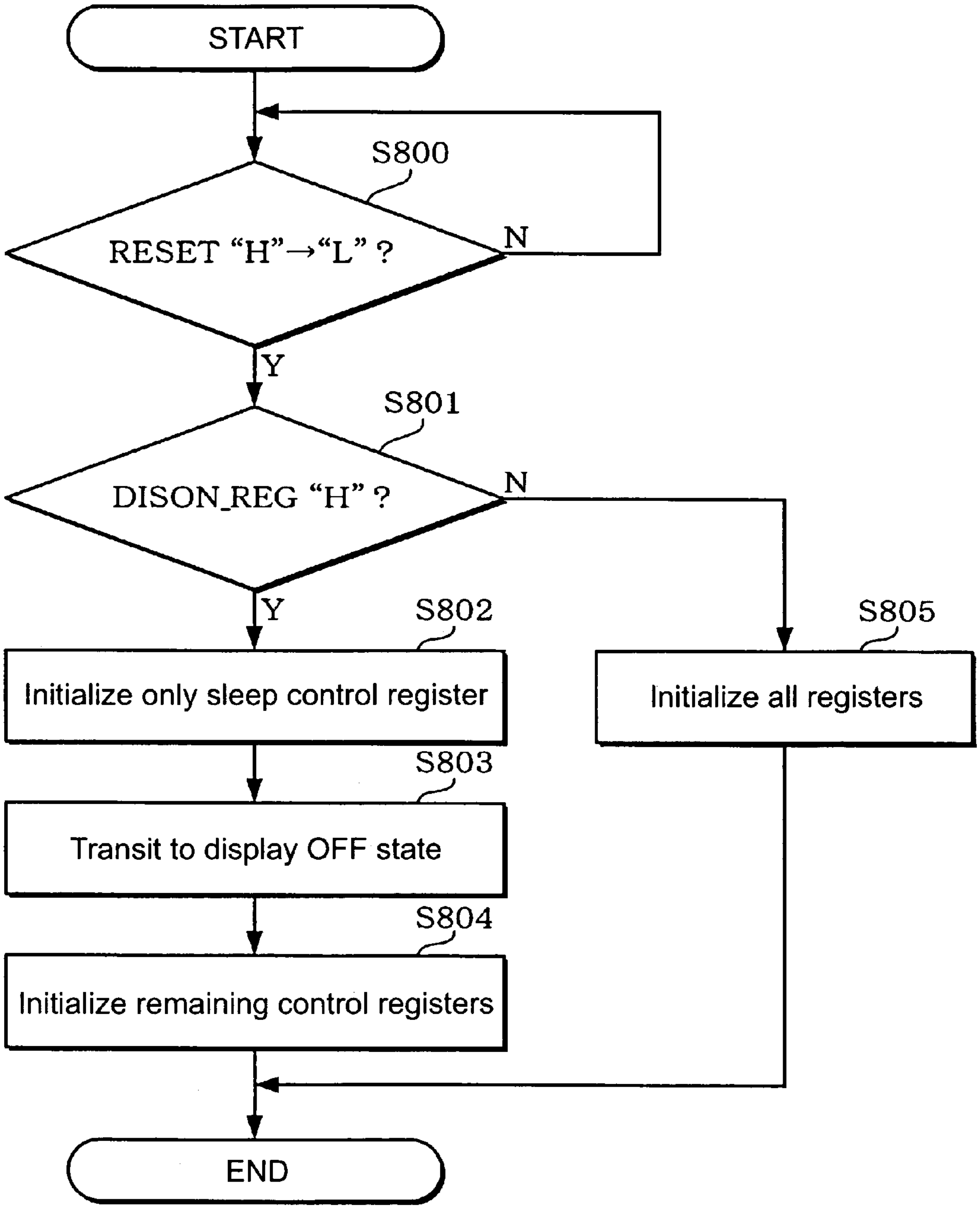
FIG. 13 shows a flow diagram illustrating an outline of operation of a circuit shown in FIG. 8.

FIG. 13 shows an outline of operational flow of the circuit shown in FIG. 8.

Figure 14:
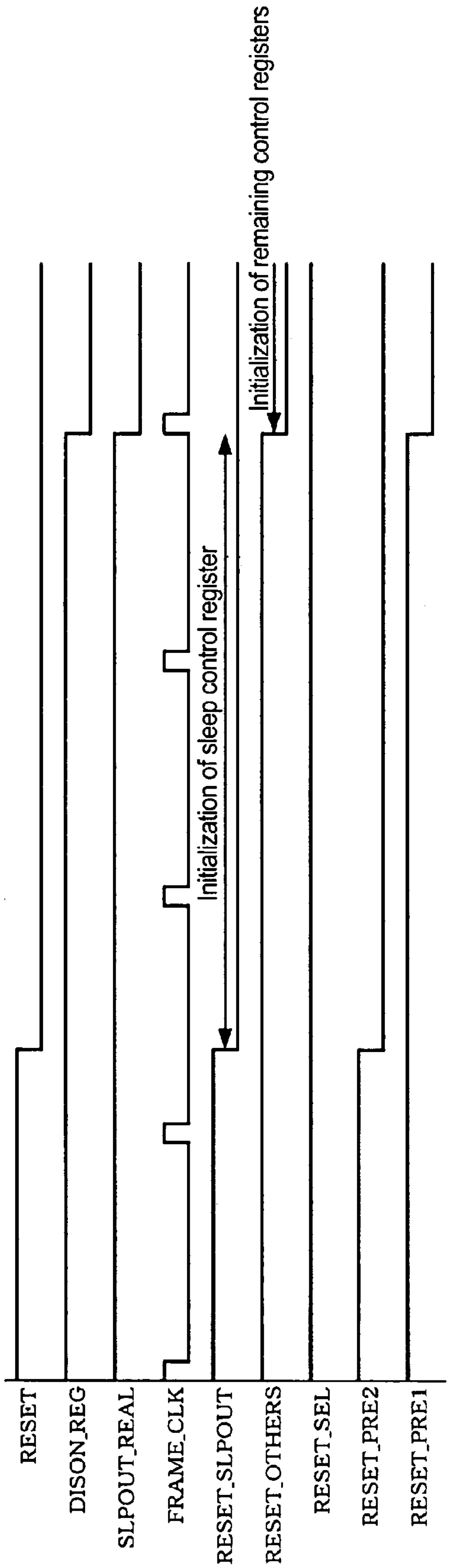
FIG. 14 shows a timing diagram of an example operation of a circuit shown in FIG. 8.

FIG. 14 shows a timing diagram for an example operation of the circuit shown in FIG. 8. In the circuit shown in FIG. 8, when the RESET signal changes from the "H" level to the "L" level (step S800:Y), DFF1 takes in the DISON_REG signal, and outputs the RESET_SEL signal. When the DISON_REG signal is at the "H" level (step S801:Y), the RESET_PRE1 signal is selected as the RESET_OTHERS signal. As a result, only the RESET_SLPOUT signal changes to the "L" level and only the sleep control register 630 is initialized (step S802). When the sleep control register 630 is initialized, the SLPOUT_REG signal changes from the "H" level to the "L" level, so that the states transits to the display OFF state (step S803). As described later, this makes the SLPOUT_REAL signal in the circuit shown in FIG. 9 change to the "L" level. Therefore, the RESET_PRE1 signal changes to the "L" level, and is output as the RESET_OTHERS signal. As a result, the remaining control registers are initialized (step S804).

On the other hand, when the RESET signal has changed from the "H" to the "L" level, and the DISON_REG signal is at the "L" level in step S801 (Step S801:N), the RESET_PRE2 signal is selected and output as the RESET_OTHERS signal (Step S805). As a result, all of the control registers including the sleep control register 630 are initialized.

Figure 15:
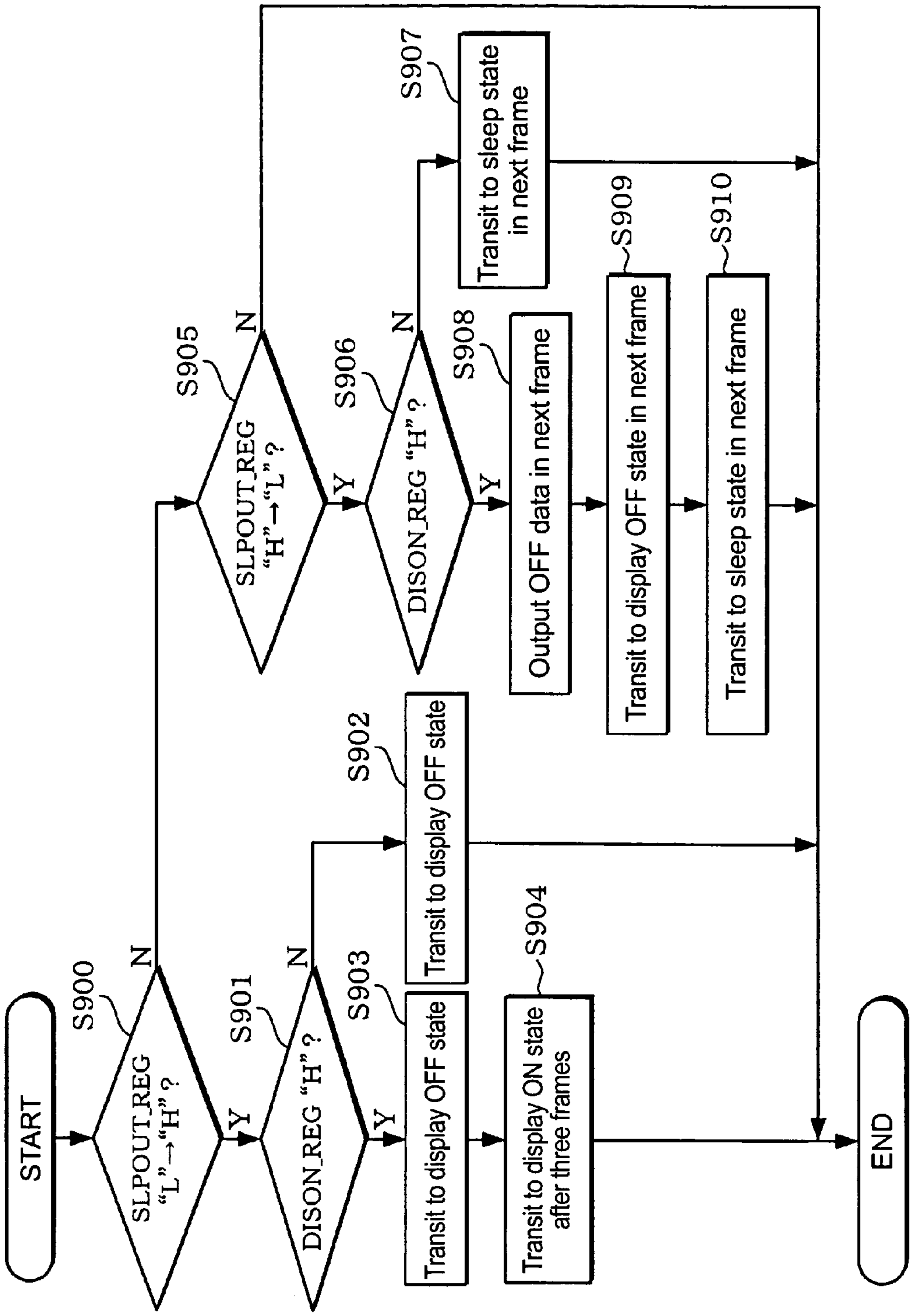
FIG. 15 shows a flow diagram illustrating an outline of operation of a circuit shown in FIG. 9.

FIG. 15 shows an outline of operational flow of the circuit shown in FIG. 9.

Figure 16:
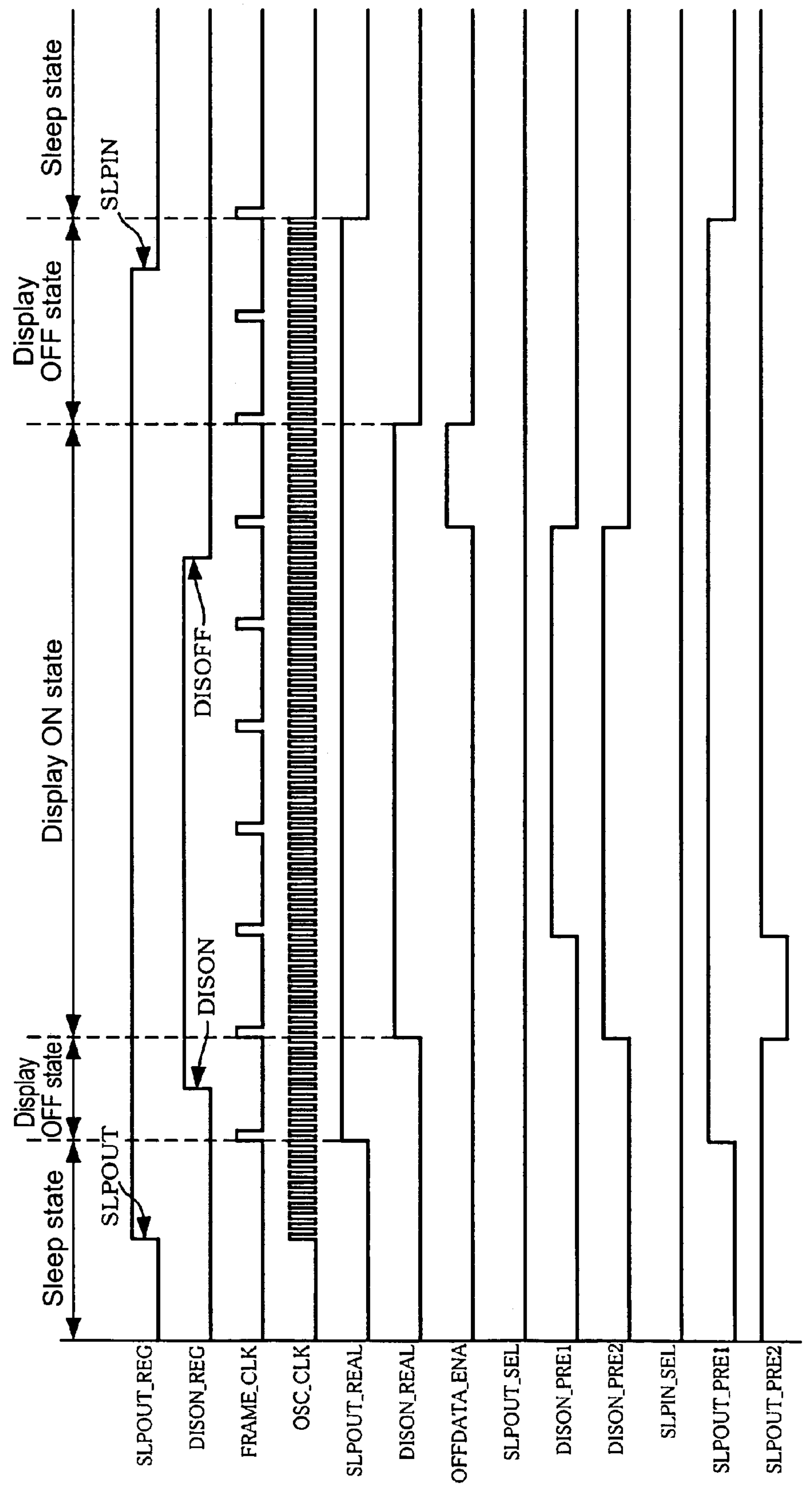
FIG. 16 shows a timing diagram of a first example operation of a circuit shown in FIG. 9

FIG. 16 shows a timing diagram for a first example operation of the circuit shown in FIG. 9. As shown in FIG. 6(A), the first example operation represents an operation where the DISON command is input after the SLPOUT command is input to the sleep state and the state is transited to the display OFF state.

Figure 17:
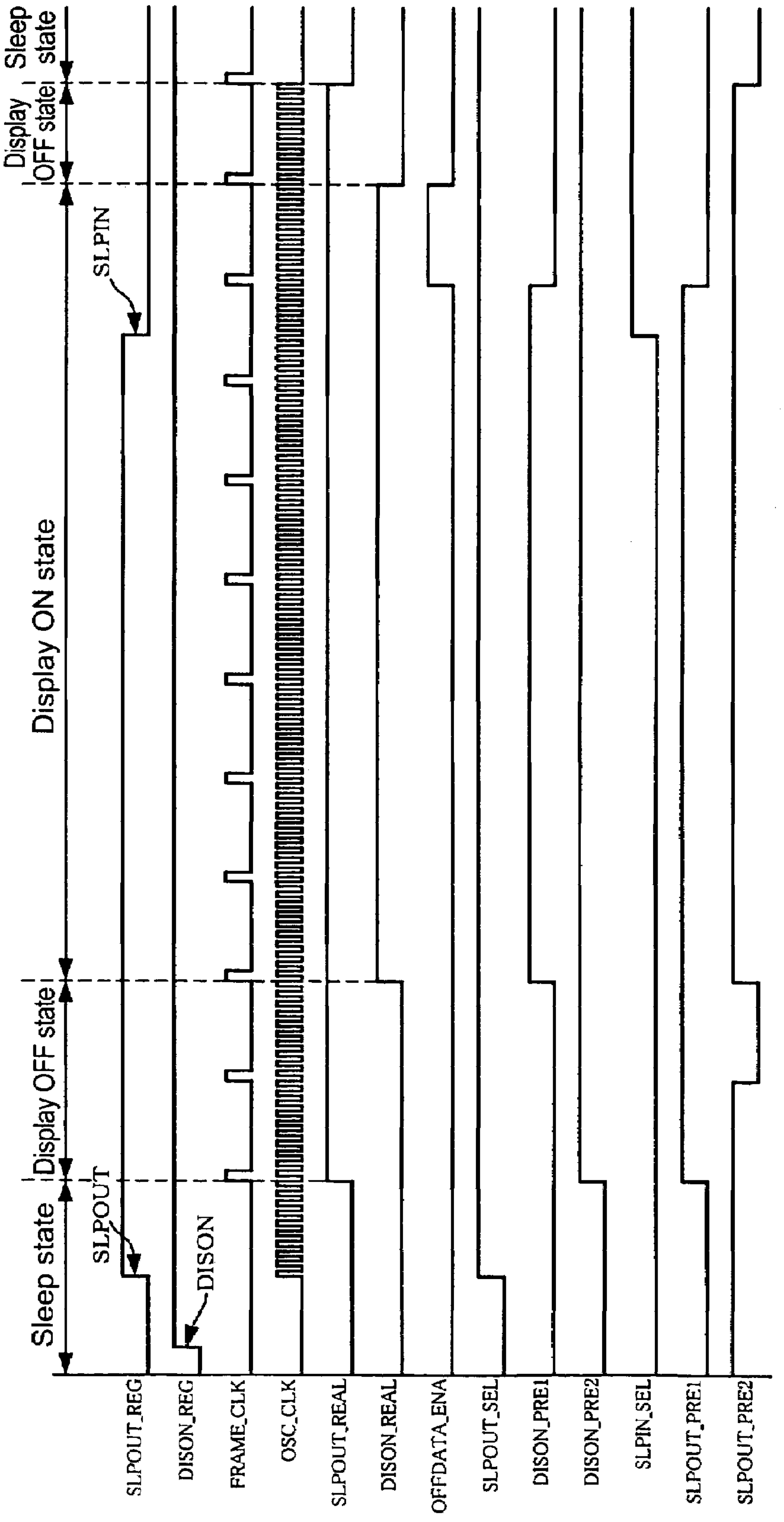
FIG. 17 shows a timing diagram of a second example operation of a circuit shown in FIG. 9.

FIG. 17 shows a timing diagram for a second example operation of the circuit shown in FIG. 9. As shown in FIG. 6(B), the second example operation represents an operation where an SLPOUT command is input after a DISON command has been input to the sleep state.

When an SLPOUT command is input to the sleep state, the SLPOUT_REG signal changes from the "L" level to the "H" level. At this time (step S900:Y), the DISON_REG signal is taken in by DFF9 shown in FIG. 9. When the DISON_REG signal is at the "L" level (step S901:N), the DISON_PRE2 signal is output as the DISON_SELOUT signal.

This makes the DISON_REAL signal change to the "L" level, triggering transition to the display OFF state (step S902). The DISON_REAL signal conducts, for example, output control of drive control signals such as the enable signal for drive of the data lines. With such output control, varying or fixing of the drive control signals is conducted. When the DISON_REAL signal is at the "H" level, output control of the drive control signals is turned on and the drive control signals are varied, while when the DISON_REAL signal is at the "L" level, output control of the drive control signals is turned off and the drive control signals are fixed.

When the DISON_REG signal is at the "H" level at step S901 (step S901:Y), the DISON_PRE1 signal is output as the DISON_SELOUT signal. The DISON_PRE1 signal changes to the "H" level when the SLPOUT_REG signal has been at the "H" level for a period of three frames. Therefore, during such period, the circuit transits to the display OFF state (step S903), as shown in FIG. 20. Then, three frames after the flame that is input the SLPOUT command, the circuit transits to the display ON state (step S904).

When the SLPIN command is input to the display OFF state or display ON state, the SLPOUT_REG signal changes from the "H" level to the "L" level. When this happens (step S900:N, step S905:Y), the DISON_REG signal is taken in by the DFF4 shown in FIG. 9. When the DISON_REG signal is at the "L" level (step S906:N), the SLPOUT_PRE1 signal is output as the SLPOUT_REAL signal. As a result, the circuit transits to the sleep state in the next frame after the one where the SLPIN command is input (step S907) as shown in FIG. 17.

At step S906, when the SLPOUT_REG signal has changed from the "H" level to the "L" level, and when the DISON_REG signal taken in by DFF4 is at the "H" level (step S906:N), the SLPOUT_PRE2 signal is output as the SLPOUT_REAL signal. When the SLPOUT_REG signal remains at the "H" level for a period of three frames, the SLPOUT_PRE2 signal changes to "H" level, so that the circuit does not transit to the sleep state during such period. When an SLPIN command is input at such period, as shown in FIG. 17, the SLPOUT_REG signal changes to the "L" level, so that the falling edge detection circuit DDET detects a fall of the output of DFF5. Therefore, in the next frame after the one where the SLPIN command was input, DFF5 and DFF6 are initialized and the DISON_PRE1 signal changes to the "L" level. As a result, in the frame where the DISON_PRE1 signal changes to the "L" level, the OFFDATA_ENA signal changes to the "H" level and drive voltage corresponding to the OFF data is output to the data lines (step S908).

In the succeeding frame, the DISON_REAL signal changes to the "L" level, so that the circuit transits to the display OFF state (step S909).

Subsequently, when two frames have passed after DFF5 is initialized at the time when the falling edge detection circuit DDET detected its falling edge, the SLPOUT_PRE2 signal changes to the "L" level, so that the circuit transits to the sleep state (step S910).

When the SLPOUT_REAL signal is at the "H" level, the operation of the power circuit can be turned on so as to generate drive power. Conversely, when the SLPOUT_REAL signal is at the "L" level, the operation of the power circuit can be turned off so as to stop generation of drive power. Moreover, when the SLPOUT_REAL signal is at the "H" level, the oscillation operation of the oscillating circuit, which generates the drive reference clock for specifying the above-described display timing and latch timing, can be turned on. Moreover, when the SLPOUT_REAL signal is at the "L" level, the oscillation operation of the oscillating circuits can be turned off.

The present invention is not limited to the above-described embodiments, and various modifications can be made within the scope of the spirit of the present invention.

The drive circuit may drive the data lines using any of a plurality of drive power types, selected on the basis of the drive signal, or may supply drive power to a buffer, then drive the data lines using power corresponding to the drive signal.

Furthermore, as for the invention cited in the dependent claims in the present invention, some of the configurational components of the independent claim may be omitted from such a configuration. Moreover, major elements of the invention relating to the independent claims of the present invention may be made dependent on other independent claims.

What is claimed is:

1. A data driver for driving data lines of an electro-optic device, comprising:

a state setting register that stores setting data for one of multiple states, the multiple states including a display ON state where drive power is generated and display operation is conducted using drive signals based on display data, a display OFF state where the drive power is generated but display operation using the drive signals is not conducted, and a sleep state where the drive power is not generated and display operation using the drive signals is not conducted;

a state setting circuit that outputs drive control signals based on the multiple states, the state setting circuit controlling transition to any of the multiple states in accordance with the setting data stored in the state setting register; and a drive circuit that drives the data lines with the drive power based on the drive control signals, the state setting circuit controlling transition from the sleep state to the display OFF state when first setting data of the setting data is received by the state setting register during the sleep state, and the state setting circuit controlling transition from the sleep state to the display OFF state and then controlling transition from the display OFF state to the display ON state when second setting data of the setting data is received by the state setting register and the first setting data is then received by the state setting register during the sleep state.

2. The data driver according to claim 1, further comprising:

a counter that counts frame pulses having a scan cycle of scan lines of the electro-optic device, the state setting circuit controlling transition from the display OFF state to the display ON state when a count value of the counter reaches a predetermined value, and the counter starting to count after the state setting circuit controls transition from the sleep state to the display OFF state based on the second setting data followed by the first setting data being received by the state setting register during the sleep state.

3. The data driver according to claim 2, the predetermined number being a product of f and Y, f being a frequency in Hertz of the frame pulses, and Y being a period in milliseconds for a power circuit for generating the drive power to stabilize after starting up, or for an oscillating circuit that outputs a clock for generating the frame pulses to stabilize after starting oscillation operation.

4. A data driver for driving data lines of an electro-optic device, comprising:

a state setting register that stores setting data for one of multiple states, the multiple states including a display ON state where drive power is generated and display operation is conducted using drive signals based on display data, a display OFF state where the drive power is generated but display operation using the drive signals is not conducted, and a sleep state where the drive power is not generated and display operation using the drive signals is not conducted;

a state setting circuit that outputs drive control signals based on the multiple states, the state setting circuit controlling transition to any of the multiple states in accordance with the setting data stored in the state setting register; and a drive circuit that drives the data lines with the drive power based on the drive control signals, the state setting circuit controlling transition from the sleep state to the display OFF state when first setting data of the setting data is received by the state setting register during the sleep state, and the state setting circuit controlling transition from the sleep state to the display OFF state and then controlling transition from the display OFF state to the display ON state when third setting data of the setting data is received by the state setting register during the sleep state.

5. The data driver according to claim 4, the state setting circuit controlling transition from the display OFF state to the sleep state when fourth setting data of the setting data is received by the state setting register during the display OFF state, and the state setting circuit controlling transition from the display ON state to the display OFF state and then controlling transition from the display OFF state to the sleep state when the fourth setting data is received by the state setting register during the display ON state.

6. A data driver for driving data lines of an electro-optic device, comprising:

a state setting register that stores setting data for one of multiple states, the multiple states including a display ON state where drive power is generated and display operation is conducted using drive signals based on display data, a display OFF state where the drive power is generated but display operation using the drive signals is not conducted, and a sleep state where the drive power is not generated and display operation using the drive signals is not conducted;

a state setting circuit that outputs a drive control signal based on the multiple states, the state setting circuit controlling transition of the multiple states in accordance with the setting data stored in the state setting register; and a drive circuit that drives the data lines with the drive power based on the drive control signals, the state setting circuit controlling transition from the display OFF state to the sleep state when fourth setting data of the setting data is received by the state setting register during the display OFF state, and the state setting circuit controlling transition from the display ON state to the display OFF state and then controlling transition from the display OFF state to the sleep state when the fourth setting data is received by the state setting register during the display ON state.

7. An electro-optic device, comprising:

a plurality of scan lines;

a plurality of data lines;

a plurality of pixels that are coupled to the plurality of scan lines and the plurality of data lines;

a scan driver for scanning the plurality of scan lines; and the data driver according to claim 1 for driving the plurality of data lines.

8. An electro-optic device, comprising:

a display panel that includes a plurality of scan lines, a plurality of data lines, and a plurality of pixels coupled to the plurality of scan lines and the plurality of data lines;

a scan driver for scanning the plurality of scan lines; and the data driver according to claim 1 for driving the plurality of data lines.

9. The data driver according to claim 1, the state setting circuit controlling transition from the display OFF state to the sleep state when fourth setting data of the setting data is received by the state setting register during the display OFF state, and the state setting circuit controlling transition from the display ON state to the display OFF state and then controlling transition from the display OFF state to the sleep state when the fourth setting data is received by the state setting register during the display ON state.

* * * * *